United States Patent [19]

Lindner

[11] Patent Number: 5,017,441
[45] Date of Patent: May 21, 1991

[54] BATTERY PACK
[75] Inventor: Henry Lindner, Elgin, Ill.
[73] Assignee: Elgin Molded Plastics, Inc., Elgin, Ill.
[21] Appl. No.: 391,118
[22] Filed: Aug. 8, 1989
[51] Int. Cl.[5] .................. H01M 2/10; H01M 2/20
[52] U.S. Cl. .................................. 429/9; 429/99; 429/159
[58] Field of Search .................. 429/9, 99, 159
[56] References Cited

U.S. PATENT DOCUMENTS 1,546,422  7/1925  Whitehead ..................... 429/99
1,547,300  2/1926  Martus et al. .................. 429/99

FOREIGN PATENT DOCUMENTS 260322  11/1926  United Kingdom .............. 429/99
761629  11/1956  United Kingdom .............. 429/159

Primary Examiner—Stephen J. Kalafut
Attorney, Agent, or Firm—Laff, Whitesel, Conte, & Saret

[57] ABSTRACT

An improved power source includes a container means which is adapted to accept a plurality of polygonal dry cell batteries, with connector means able to contact their terminals regardless of their angular disposition.

19 Claims, 3 Drawing Sheets

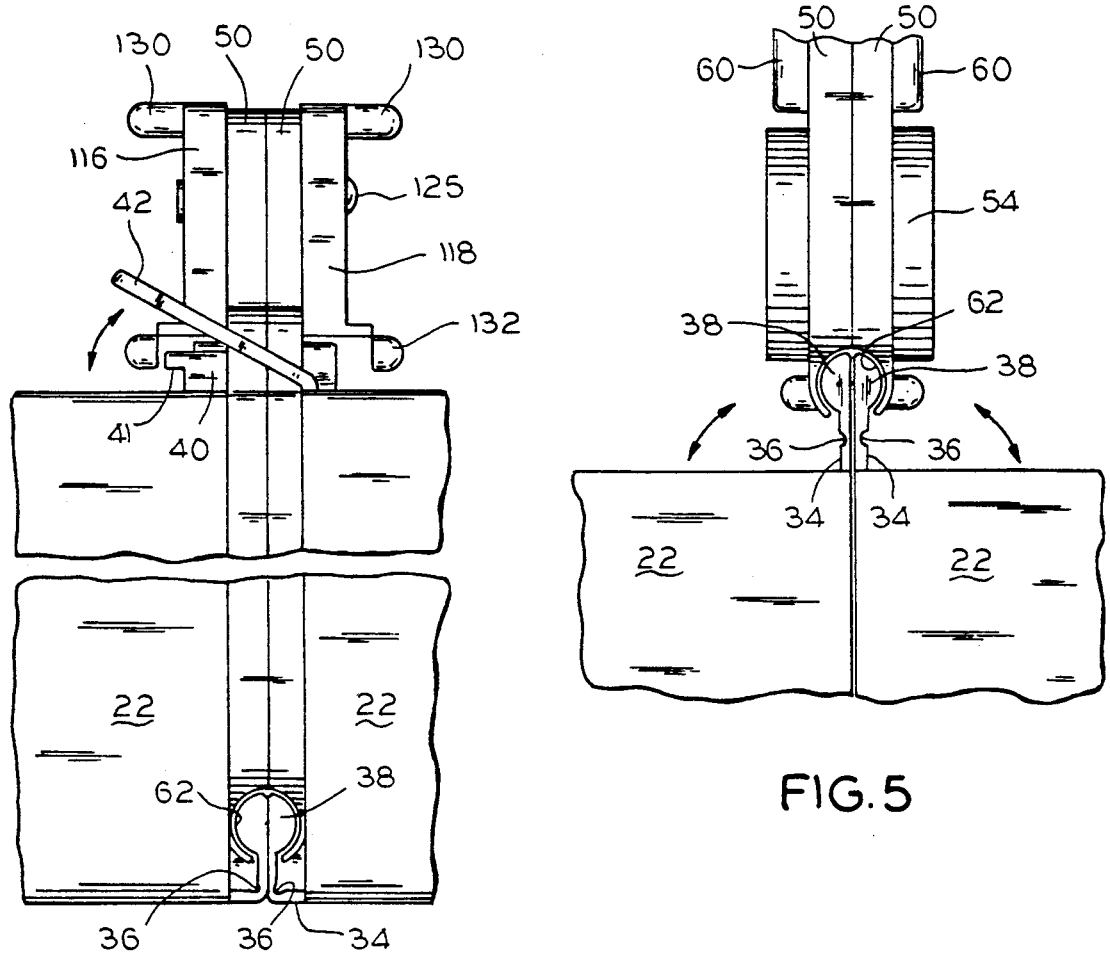
FIG. 5
FIG. 7
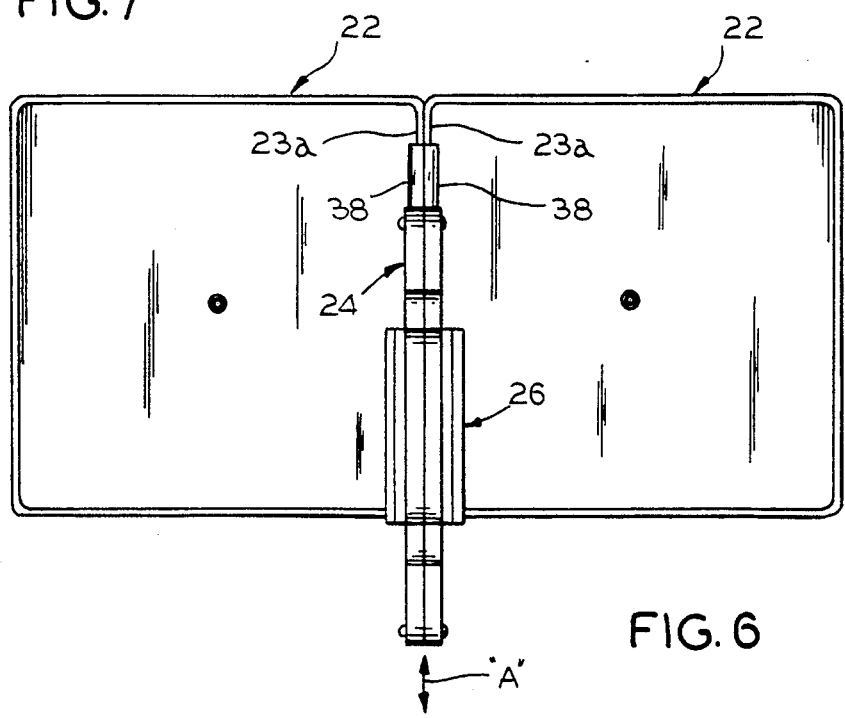
FIG. 6

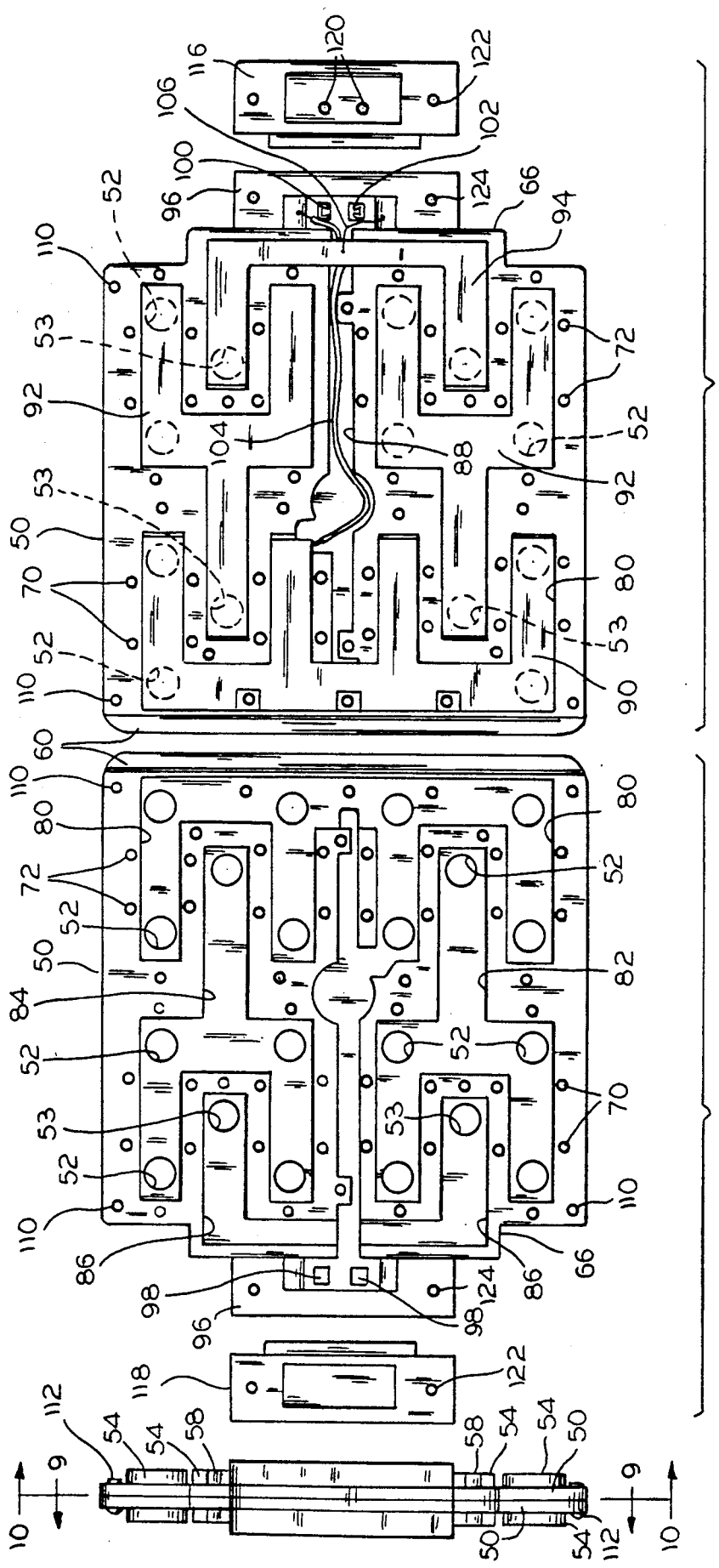

BATTERY PACK

This invention relates to an improved power source for use with remote units not having normal power sources readily accessible to them.

BACKGROUND OF THE INVENTION

Type "B" high intensity warning lights that are utilized with various forms of road barricades require an extended usage form of power supply to be available for the powering of flashing warning lights that become operative either by the absence of light, i.e. night time operation, or which become activated by the oncoming headlights of an approaching vehicle. Other usages where such a power source might be found would be in emergency lights, either flashing or constant beam, that can be manually controlled by suitable switching means, for alerting third parties of the presence of a dangerous situation, be it an accident or a natural disaster.

Heretofore, the high intensity warning lights, mentioned above, normally included a light source, surrounding lens means, interrupter means for causing the light source to pulsate or flash, and an enlarged container for holding an enlarged B-Lite Type Battery that provided an extended life 12 volt source of power. Such B-Lite Type Batteries are relatively expensive in price and are not readily available at remote distribution locations because of their specialized application. Additionally, they are not rechargeable nor are they repairable. Should a single cell of such a battery be faulty it is impossible to replace the faulty cell and take advantage of the capability of the balance of the battery to provide adequate power.

Additionally, such B-Lite Type Batteries have a paper-board type of outer container that does not readily resist moisture conditions in which such batteries often find themselves. Even though that type of battery individually is generally utilized within a metallic box-like container, it is necessary to transport large replacement quantities to remote locations where miles and miles of road repairs must be delineated by flashing lights on the barricades placed between lanes of repair work. Such batteries with their paper-board containers will inevitably be exposed to the elements and particularly rain water which causes deterioration of the container resulting in deleterious effects on such batteries and the loss of funds for replacement of such damaged batteries.

SUMMARY OF THE INVENTION

An object of the present invention is to provide a relatively inexpensive source of power that can be replenished, repaired, or modified by the user with relative ease.

A further object of the present invention is to provide an improved power source including at least one insulating container adapted to accept a plurality of large sealed readily available dry cell batteries having their positive and negative terminals extending axially from one end of the battery and an integrated universal connector means contacting the terminals in a predetermined circuitry.

Another object of the present invention is to provide a pair of open ended insulated containers each adapted to accept four 6 volt spring terminal batteries, said universal connector means including fastener means for ready assembly with a juxtaposed pair of said containers.

Still another object of the invention is to connect pairs of said batteries in series to provide a 12 volt source of power and also to connect pairs of said serially connected batteries in parallel to thereby provide a constant voltage and extended life by such connection. The connections provided by the universal connector are accomplished without regard to the orientation of such batteries during their installation into the containers, therefore insuring ease of assembly.

The use of eight readily available 6 volt spring terminal batteries, that are inexpensive in comparison to the larger B-Lite Type Batteries, in a reuseable housing which does not require orientation of the angular disposition of the terminals, and where the integrated universal connector means not only provides closure for the containers and connection circuitry for the batteries, but, also provides integral fastener means for cooperative fastening of two containers into a single juxtaposed unit with the connector means serving not only as a closure but also a divider with handle means for an improved battery pack power source.

Other objects will be apparent to those skilled in the art with alternative mechanical equivalents being contemplated by this invention and with the coverage being limited only by the appended claims.

BRIEF DESCRIPTION OF THE DRAWINGS

FIG. 5 is a partial elevational view of the identical two body portions being in side-by-side juxtaposed relation and with the channel shaped portion of the universal connector embracing the hinge mounted rib members integral with the body portions to form a unitized assembly;

FIG. 6 is a top plan view showing the two body portions, devoid of batteries, being assembled with the universal connector that is capable of movement linearly in both directions as indicated by the double-ended arrow "A";

FIG. 7 is a partial elevational view showing the two body portions hinged upwardly into juxtaposed position, on opposite sides of the universal connector means, and illustrating the integral hook and latch means provided on the two body portions along the edge opposite the integral hinged mounted rib means positioned along one open end edge of each of said body portions;

FIG. 8 is a top end view of the integrated universal connector means;

FIG. 9 is an expanded internal plan view of one-half of the universal connector means taken along line 9—9 in FIG. 8; and FIG. 10 is a similar expanded internal plan view of one-half of the universal connector means taken along 10—10 in FIG. 8, with flat strip-like interconnectors and the plug means installed in this half of the connector.

DETAILED DESCRIPTION OF THE INvENTION

Figures 1, 2, 3, 4:
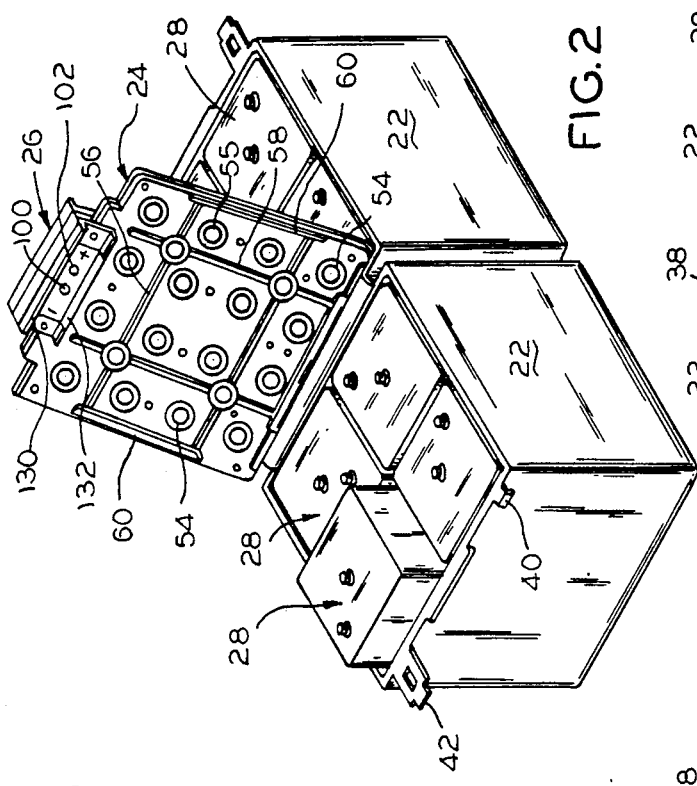
FIG. 1 is a perspective of one assembled embodiment of the present invention.
FIG. 2 is a perspective view of the embodiment of FIG. 1 with the container portions of the body unfastened and rotated 90 degrees to an open position exposing the batteries and showing the integrated universal connector means in a semi-upright angular position.
FIG. 3 is a plan view of the embodiment shown in FIG. 2 with the connector means lying horizontally flat on the right side, as seen in the drawing.
FIG. 4 is an exploded plan view similar to FIG. 3 except that the universal connector means has been disengaged (not shown in this view) and the two identical body portions being separated slightly and with the common connecting edges of the two portions in juxtaposition.

Referring now to the drawings wherein similar parts are designated by similar numerals, the improved economical, replenishable, power source or battery pack 20, includes a pair of open ended container-like body portions 22, an integrated universal connector means 24 having handle means 26, and a plurality of 6 volt batteries 28 each having axially extending spring terminals 30 and 31 at one end thereof.

For economies in manufacture, the body portions 22 are preferably identical and provide matching fastening means along the free ends of opposite walls of the polygonal container-like member forming a single body portion 22, with the fastening portions of two such body portions being adapted for cooperation with a similar body portion when oriented properly. For example, along the free edge 23a of one such wall there is an extension 34 running along a substantial portion of the extent of that free edge that includes an intermediate thinned portion forming a hinge-like element 36 and with the extension 34 terminating in a semi-cylindrical rib-like protuberance 38 facing convexly inwardly. Thus, the extension 34 along its outside surface is substantially co-planar with the rest of the wall below edge 23a, from which it projects.

At predetermined spaced points along the free edge 23b of the opposite wall there are provided spaced fastener means in the form of a hook 40 and latch 42, as will be more thoroughly explained hereinafter. Intermediate the hook 40 and latch 42, a small reinforcing flange 44 also extends out from edge 23b, for purposes to be explained more fully hereinafter. The body portions 22 that make up the housing for this embodiment can both be injection molded in the same die from a suitable electrically insulating plastic such as polyethylene, polycarbonate, or the like. Preferably it has flexibility in thin sections, i.e., where it is utilized for hinge sections such as hinge 36.

The major portions of the integrated universal connector means 24, like the housing portions 22, are also economically fabricated from two identical parts having mating characteristics when the inner surfaces of the two parts are brought into juxtaposition.

First, let us discuss the outer surface of the substantially planar rigid parts 50 which, when joined in juxtaposition, form the body of connector means 24. In the illustrated embodiment the parts 50 each have a plurality of through bores 52 which are arranged in quadrature about four through bores 53. The number of through bores 53, and their accompanying through bores 52 in quadrature, are dependent upon the electrical power required for the particular application confronted by the designer. The present embodiment design is in response to the replacement needs of a B-lite battery.

Surrounding each of the through bores 52 and 53, on this outer surface, are a like number of collar-like members 54 which have a tapered inner wall 55 that serve as a guide into the through bores 52 and 53. A number of vertically and horizontally disposed rib-like protuberances 56 and 58 form a grid-like pattern for reinforcement of the rigidity of parts 50. A pair of ribs 60 are spaced inwardly from opposite edges and extend for a substantial portion of the length of said edges. The ribs 60 are spaced apart a predetermined distance substantially equal to the predetermined distance between the inside surface of opposite side walls of the portions 22 to thereby provide positive spaced means for location of the connector means relative to the open end of the portions 22.

On another edge located between the edges carrying the ribs 60 is an inner surface concave groove 62 generally complimentary in cross-sectional configuration to the convexity of ribs 38, as best seen in the enlarged views in FIGS. 5 and 7. The groove 62, when combined with its companion part by the juxtaposition of two parts 50, forms a channel that is closed at one juncture of the groove with the planar portion of part 50 and having a circumferential extent that is substantially greater than 180 degrees, but with the other juncture, with an imaginary extension of the planar portion of part 50, being spaced apart a sufficient amount to accommodate the combined thickness of that part of extensions 34 that connect with ribs 38 above the hinges 36. (See FIGS. 5 and 7)

The fourth side edge of each part 50, opposite the one edge carrying the groove 62 has a lateral flange 66 which will be discussed in greater detail hereinafter.

As was indicated previously, the batteries 28 each have a pair of axially extending spring terminals 30 and 31. Terminal 30 is the negative terminal or cathode and is positioned substantially on the axis of the battery. The positive terminal 31 or anode is positioned radially outwardly from terminal 30 on a radially line angularly directed to one of the corners of the square 6 volt battery. As will be seen hereinafter, as long as the terminal 30 of each battery is positioned within the through bore 53 and the terminal 31 is located within one of the through bores 52 located in quadrature to bore 53, the desired circuit for the operation of the present device will be completed, as will be described hereinbelow.

Referring now to FIGS. 8-10, in this embodiment the two square parts 50, shown in FIGS. 9 and 10, are identical electrically insulating parts with their respective bottom edges having the matching grooves 60 being in juxtaposed relation at adjacent edges of FIGS. 9 and 10, as viewed in the drawing. A plurality of pin-like protuberances 70 are provided in a multiplicity of positions on the face of the parts 50 and are matched by a likenumber of complimentary mirror image depressions or bores 72 for acceptance of the protuberances 70 when the parts 50 are in face to face juxtaposition to aid in preventing lateral movement thereof.

As best seen in FIG. 9, the inner surface of each identical part 50 includes, in this embodiment, four shallow flat depressions or recesses. The first recess 80 is shaped like a base connected double-U with four arms projecting outwardly from a base that lies along the edge carrying the groove 60. The second recesses 82 and 84 are identical Y-shapes; while the third recess 86 is generally U-shaped. A deeper centrally located groove 88 extends down the middle of part 50 and is deep enough to accommodate a connecting wire, as explained below. It will be noted that each of the shallow flat recesses overlie and relate to a particular combination of through bores.

Referring now to FIG. 9, a complimentary flat sheet metal part occupies each of the shallow recesses. Interconnector 90 occupies the recess 80; two interconnectors 92 individually occupy one of the recesses 82 and 84; while interconnector 94 occupies recess 86.

The lateral flange 66 includes an extension 96 having a pair of non-circular through bores 98. A pair of individual socket elements 100 and 102 are telescopically mounted within the bores 98 in extension 96 of one of the parts 50, shown specifically in FIG. 10. Socket element 100 is connected by wire 104 to the strip interconnector 90 and is considered the positive socket element, while socket element 102 is connected by wire 106 to strip interconnector 94 and is considered the negative socket element.

The two parts 50 with their enclosed strip interconnectors 90, 92, and 94 and wired socket elements 100 and 102 are brought into juxtaposed relation and maintained by suitable fastener means, such as rivets 112 projecting through a like-number of apertures 110. Two covering elements 116 and 118 are utilized to cover extension 96 on the outside surface thereof. The element 116, shown in FIG. 10, includes a pair of round apertures 120 to provide appropriate prong access to the socket elements 100-102, while the other element 118, shown in FIG. 9, is continuous or uninterrupted and prevents unwanted entry into the socket elements 100-102 from the improper side, which might tend to dislodge them. Each of these elements, 116 and 118 include an enlarged transverse flange 130 and a shorter spaced flange 132 along the opposite side of each element. These elements include apertures 122 that align with apertures 124 on extension 96 and provide suitable through openings for the acceptance of fastening means such as rivets 125 (see FIG. 7) to project therethrough and serve as means for retention of the elements on extension 96. The two oppositely projecting flanges 130 act as a handle gripping means while the shorter flange 132 engages the outside surface of its confronting intermediate side wall flange 44 while the tapered end of the rib 58 engages the inside surface of the same side wall. Thus the flange 132, rib 58 and the side ribs 60 ensure that the integrated universal connector means 24 will be properly located when it is confronted with the free end of the body portions 22.

In the operation of this embodiment of the invention, a pair of the identical body portions 22 are brought into juxtaposed relation with the open ends facing upwardly, as seen in FIGS. 4 and 6, and an assembled two piece planar connector means 24 with the open channel formed by grooves 60 being telescoped with and slid over the ribs 38, as seen in FIGS. 5 and 6, until the grooves 62 are centrally located on the ribs 38. The batteries 28 are then loaded, four to a side body portion, without regard to the angular diposition of the anode in any one of the batteries since this is totally accounted for in the disposition of the holes 52 in quadrature around holes 53. The two halves of the whole are swung upwardly by bending the extension 34 about hinge elements 36, along the direction indicated by the double arrow "B", until the free edges of the body portions 22 are juxtaposed to the outside surface of the parts 50, as best seen in FIG. 7, whence the latch 42 with its central aperture can be pushed downward, as shown by the double arrow "C", until its aperture slips over the catch 40 and the latch 42 underlies the shoulder means 41 and flange 132 overlies and engages side wall flange 44, thereby locking the two parts 22 together against the connector 24 and with the spring terminal posts 30 and 31 of each battery, finding their way into the bores 53 and 53 with the assistance of the tapered collar means 54 surrounding each bore, provide spring pressure against opposite surfaces of the interconnectors 90, 92, and 94, captured in the recesses 80-86, forcing the body portions 22 away from one another by said spring pressure of the terminal and thereby insuring positive engagement by said latch means.

When the circuitry shown in FIG. 10 is considered, each pair of batteries disposed from right to left, namely, an upper pair and a lower pair, are connected in series and will multiply the voltage by two; while the upper and lower pairs of batteries are connected in parallel. This is done automatically without any effort at angular orientation the batteries when loading.

Thus, the present invention provides an inexpensive source of batteries that can be utilized in the present invention and installation made by unskilled labor without any confusion during insertion of the batteries in the proposed battery pack. The overall size of the improved pack is smaller than the B-Lite Type Batteries and hance is readily acceptable within the standard B-Lite housing. The reusability of this hording, its universality of battery orientation, the spring pressure of the terminals insuring proper latching, and the sealed nature of the normal six volt battery offer distance economical and mechanical advantages over the competing forms of power.

other modification and mechanical equivalents may be apparent to those skilled in the art but it is desired that my coverage be only limited by the scope the appended claims.

I claim:

1. An improved power source including at least one container means adapted to accept a plurality of dry cell batteries each having an external axially extending polygonal configuration, said batteries each having their positive and negative terminals extending axially from one end of said battery, one of said terminals being disposed on the axis of said battery while the other of said terminals being disposed adjacent one corner of said polygon, integrated universal connector means contacting said terminals providing a circuitry that is the same regardless of the angular disposition of any of said batteries relative to their individual axis.

2. An improved power source as claimed in claim 1 wherein each of said batteries are generally rectangular in cross-section and have one terminal centrally located on the axis of said battery while the other terminal is located on a radial line directed from said axis to one corner of said battery.

3. An improved power source as claimed in claim 1 wherein each said terminal is an axially compressible spring terminal means to insure proper contact when utilized.

4. An improved power source as claimed in claim 3 wherein said integrated universal connector means includes a generally planar member having a plurality of apertures adapted to accept said spring terminal means, said planar member further including at least two strip-like current carrying means properly disposed relative to said planar member and its said plurality of apertures, said strip-like means adapted to accept contact by said spring terminal means and provide serial connections between pairs of said batteries and parallel connections between multiple combinations of said pairs regardless of the angular orientation of said batteries within said at least one container.

5. An improved power source as claimed in claim 4 wherein said at least one container includes a bottom, sidewalls extending upwardly therefrom and means disposed along one free edge of one of said sidewalls, said planar member including fastening means adapted to cooperate with said means disposed along said one free edge, at least one of said last mentioned means or said fastening means including hinge means to permit said planar member with its assembled connector means to form a hinged closure for said at least one container means, said planar member further including means for connecting said power source to an outside device for utilization of said power from said batteries.

6. An improved power source as claimed in claim 5 wherein said at least one container is square in cross-sectional configuration, said polygonal batteries being substantially square in cross-sectional configuration and with four of said batteries being adapted to be complimentarily accepted in quadrature in said at least one container, said at least one container also including latching means disposed on the side thereof opposite the side carrying said hinge means.

7. An improved power source as claimed in claim 6 wherein said at least one container is two in number, said hinge means of each of said containers having an elongated rib connected thereto and parallel to said free end of said containers, said planar member including an elongated bore along one edge thereof and adapted to telescopically accept said ribs in confronting relationship therein and thereby hingedly join said two containers into a single unit, said planar member including two interconnected flat apertured members provided with means for cooperatively positioning said flat connector means between said flat members in oriented relation to the apertures in both of said last mentioned members, socket means associated with said planar member to provide access means to the power potential developed by said batteries, said planar member adapted to act as a central divider and closure means when the open ends of said containers are in juxtaposition thereto, said latching means on said containers in conjunction with said hinge means serving to form a closed package of said plurality of electrically interconnected batteries.

8. An improved battery pack system including an integrated universal connector means for accepting and contacting the axially extending end terminals of a plurality of substantially square shaped batteries in a circuitry array, said batteries each having a first central axially disposed terminal and a secondary terminal radially located towards on corner of said square, said connector means including a plurality of groups of apertures, each group including a central aperture for accepting said first central terminal of an individual battery and four secondary apertures positioned in quadrature for adapting said secondary terminal in one of said secondary apertures regardless of the angular orientation of said battery relative to its axis, connector means disposed beneath search aperture for contact with said fist and secondary terminals regardless of their array.

9. An improved battery pack system as claimed in claim 8 wherein said integrated universal connector means includes a pair of generally planar insulating members of substantially identical configuration each having said plurality of groups of apertures disposed in a generally square pattern, the outwardly facing surface of said members each including internally tapered circular wall means surrounding each aperture and adapted to direct and guide said terminals into an appropriate aperture.

10. An improved battery pack system as claimed in claim 9 wherein the inwardly facing juxtaposed opposite surfaces of said members include complimentary means that cooperate to prevent lateral movement of said members relative to one another, mirror image recess means on each of said inwardly facing surfaces of said members extending between predetermined apertures in a particular array and flat sheet metal generally strip-like in configuration that is acceptable within said recesses and forms the predetermined circuit connectors, means for connecting said two members with said mirror image recess means in juxtaposed fixed relation, and means for conveying the current collected by said connectors to an external utilizer.

11. An improved battery pack system as claimed in claim 10 wherein said complimentary means for preventing lateral movement includes a plurality of protuberance means and a like number of complimentary depressions.

12. An improved battery pack system as claimed in claim 11 wherein at least an appropriate two of said sheet metal connectors are electrically connected to a plug receptacle for delivery of said cumulative current to an external utilizer.

13. An improved battery pack system as claimed in claim 12 wherein said juxtaposed members include a lateral extension along a common edge of each of them which extensions form means for carrying said plug receptacle, secondary means compatible with said plug and including rib means for defining gripping means for carrying the proposed system.

14. An improved battery pack system as claimed in claim 13 wherein the side of said juxtaposed members opposite said lateral extension includes complimentary means formed by said juxtaposed members which defines an open channel shaped means, open along one edge and at opposite ends, and adapted to accept a complimentary rib means on a secondary portion of said system for fastening thereto.

15. An improved battery pack system as claimed in claim 10 wherein said strip-like connector means are designed to combine individual pairs of batteries in a series connected relation to double the voltage normally obtainable from such dry cells and to then interconnect such individual pairs into a parallel relation thereby extending the life of said individual pairs.

16. An improved battery pack system as claimed in claim 15 including a plurality of individual batteries each of which has its terminals projecting from one end thereof, said batteries being generally polygonal in cross-sectional configuration, at least one insulated open ended container means generally rectangular in configuration and adapted to complimentarily accept a plurality of said batteries, said container means having a depth adequate to accept substantially all of the height of said batteries, said integrated universal connector means adapted to close the open end of said at least one container means and also provide a predetermined circuitry connectable to said terminal means regardless of orientation about the axis of said batteries.

17. An improved battery pack system as claimed in claim 16 wherein said at least one container means includes a polygonal bottom and closed side walls extending upwardly therefrom, at least one of said side walls including a flexible extension forming hinge-like means, and protuberance means integral with said hinge-like means remote from said at least one side wall, said universal connector means having an external configuration substantially complimentary to said side wall cross-sectional configuration, said fastener means along one edge of said connector means complimentary to and accepting said protuberance means whereby said connector means is hingedly connected to said at least one side wall and movable between an open and a closed position relative to said open end of said at least one container.

18. An improved battery pack system as claimed in claim 14 wherein said juxtaposed members can be readily opened for inspection and testing of individual batteries as well as for replacement of defective individual batteries in said pack.

19. An improved battery pack system as claimed in claim 17 wherein said juxtaposed container means can be readily opened for inspection and testing of individual batteries as well as for replacement of defective individual batteries in said pack.

* * * * *